US012789208B2

(12) United States Patent
Dettlaff

(10) Patent No.: US 12,789,208 B2
(45) Date of Patent: Nov. 10, 2026

(54) FLUID RESERVOIR FOR A SPRAY GUN WITH A SCREW CAP

(71) Applicant: SATA GmbH & Co. KG, Kornwestheim (DE)

(72) Inventor: Peter Dettlaff, Remseck (DE)

(73) Assignee: SATA GmbH & Co. KG, Komwestheim (DE)

( * ) Notice: Subject to any disclaimer, the term of this patent is extended or adjusted under 35 U.S.C. 154(b) by 193 days.

(21) Appl. No.: 18/017,897

(22) PCT Filed: Jul. 29, 2021

(86) PCT No.: PCT/EP2021/071254
§ 371 (c)(1),
(2) Date: Jan. 25, 2023

(87) PCT Pub. No.: WO2022/023467
PCT Pub. Date: Feb. 3, 2022

(65) Prior Publication Data

US 2023/0271201 A1 Aug. 31, 2023

(30) Foreign Application Priority Data

Jul. 31, 2020 (DE) ..................... 10 2020 120 226.1

(51) Int. Cl.
*B05B 7/24* (2006.01)

(52) U.S. Cl.
CPC .......... *B05B 7/2408* (2013.01); *B05B 7/2478* (2013.01)

(58) Field of Classification Search
CPC ........ B05B 7/1413; B05B 7/24; B05B 7/2402
(Continued)

(56) References Cited

U.S. PATENT DOCUMENTS 2,595,317 A 5/1952 White
3,157,360 A * 11/1964 Heard .................. B05B 7/2435 239/378
(Continued)

FOREIGN PATENT DOCUMENTS

BE 1018968 A3 12/2011
CN 1541176 A 10/2004
(Continued)

OTHER PUBLICATIONS

For U.S. Appl. No. 15/575,585: Office Action dated Jul. 18, 2018, Response filed Nov. 9, 2018 Final Rejection dated Feb. 5, 2019, Response filed Jun. 5, 2019 Notice of allowance dated Jul. 10, 2019.
(Continued)

*Primary Examiner* — Chee-Chong Lee
(74) *Attorney, Agent, or Firm* — Fleit Intellectual Property Law; Paul D. Bianco

(57) ABSTRACT

A spray gun fluid reservoir has a material outlet which is configured for the direct and/or indirect connection to a spray gun. The fluid reservoir includes a material container and a screw cap closing the material container. During a detachable and fluid-tight connection of the material container and the screw cap and the forming of a screw connection, an edge region of the material container is to be arranged in a receiving groove at the screw cap. Advantageously, a central region of the screw cap, which adjoins the receiving groove, is designed as a continuation of at least a predominant part of an inner limb of the receiving groove.

19 Claims, 7 Drawing Sheets

(58) Field of Classification Search
USPC .......................................................... 239/340
See application file for complete search history.

(56) References Cited

U.S. PATENT DOCUMENTS 3,240,398 A * 3/1966 Dalton, Jr. ............ B05B 7/2408 239/371
3,270,920 A 9/1966 Nessler
3,401,842 A 9/1968 Morrison
3,714,967 A * 2/1973 Zupan ................... B05B 7/2408 239/318
4,151,929 A 5/1979 Sapien
4,174,070 A * 11/1979 Lau ......................... B05B 7/241 239/347
4,270,668 A 6/1981 Berfield
4,388,997 A * 6/1983 Grime ................... B05B 7/2408 220/203.14
4,430,084 A 2/1984 Deaton
5,582,350 A 12/1996 Kosmyna
5,713,519 A 2/1998 Sandison
5,797,520 A 8/1998 Donahue
6,435,426 B1 8/2002 Copp
6,474,515 B1 11/2002 Ladina
D474,528 S 5/2003 Huang
6,820,824 B1 11/2004 Joseph
6,877,677 B2 4/2005 Schmon
7,083,119 B2 8/2006 Bouic
7,175,110 B2 2/2007 Vicentini
D574,926 S 8/2008 Huang
7,416,140 B2 8/2008 Camilleri
7,568,638 B2 8/2009 Gehrung
7,575,126 B2 8/2009 Kemper
7,614,571 B2 11/2009 Camilleri
7,694,896 B2 4/2010 Turnbull
7,798,427 B2 9/2010 Joseph
7,810,744 B2 10/2010 Schmon
7,819,341 B2 10/2010 Schmon
7,823,806 B2 11/2010 Schmon
D644,803 S 9/2011 Schmon
8,052,071 B2 11/2011 Kruse
8,297,536 B2 10/2012 Ruda
8,444,067 B2 5/2013 Schmon
D689,590 S 9/2013 Brose
D692,530 S 10/2013 Gehrung
D692,532 S 10/2013 Li
8,925,836 B2 1/2015 Dettlaff
9,259,960 B1 2/2016 Tepsi
D758,533 S 6/2016 Dettlaff
9,878,336 B2 1/2018 Gehrung
D810,865 S 2/2018 Hegdahl
D815,248 S 4/2018 Hegdahl
10,357,789 B2 7/2019 Camilleri
10,434,527 B1 10/2019 Smitshoek
10,471,450 B2 11/2019 Kruse
D916,231 S 4/2021 Xiao
D916,232 S 4/2021 Xiao
D952,097 S 5/2022 Kang
D953,485 S 5/2022 Xiao
12,544,776 B2 2/2026 Gehrung
2003/0006310 A1 1/2003 Rothrum
2004/0164182 A1 8/2004 Joseph
2005/0155968 A1 7/2005 Kosmyna
2005/0156058 A1 7/2005 Kosmyna
2006/0102550 A1 5/2006 Joseph
2006/0113409 A1 6/2006 Camilleri
2006/0196891 A1 9/2006 Gerson
2006/0283861 A1 12/2006 Kosmyna
2007/0018016 A1 1/2007 Yechouron
2007/0158349 A1 7/2007 Schmon
2007/0158462 A1 7/2007 Delbridge
2007/0164058 A1 7/2007 Burkovskiy
2007/0221754 A1 9/2007 Gehrung
2007/0272323 A1 11/2007 Verhaeghe
2008/0011879 A1 1/2008 Gerson
2008/0179763 A1 7/2008 Schmon
2009/0014557 A1 1/2009 Schmon
2009/0072050 A1 3/2009 Ruda
2009/0108089 A1 4/2009 Handzel
2010/0288772 A1* 11/2010 Wambeke ............. B05B 7/2408 220/373
2011/0174901 A1 7/2011 Dettlaff
2012/0000992 A1 1/2012 Shih
2012/0043352 A1 2/2012 Rasmussen et al.
2012/0267388 A1 10/2012 Tom
2012/0273583 A1 11/2012 Gerson
2012/0280062 A1 11/2012 Pellegrino
2012/0291890 A1 11/2012 Pan
2013/0001317 A1 1/2013 Staunton
2014/0103143 A1* 4/2014 Lin ....................... B05B 9/0894 239/379
2014/0131380 A1 5/2014 Pethe
2014/0332532 A1 11/2014 Wang
2014/0339329 A1 11/2014 Lawrence
2015/0108135 A1 4/2015 Hanna
2016/0052002 A1 2/2016 Schulz
2016/0303594 A1 10/2016 Nyarbo
2017/0203887 A1 7/2017 Hegdahl
2017/0239679 A1 8/2017 Bierie
2018/0147586 A1 5/2018 Kruse
2018/0185869 A1 7/2018 Hegdahl
2019/0126300 A1 5/2019 Li
2020/0094276 A1 3/2020 Sun
2021/0078024 A1 3/2021 Hegdahl
2021/0197153 A1 7/2021 Schreiber
2022/0001406 A1 1/2022 Ruda
2022/0080435 A1 3/2022 Joseph
2023/0143762 A1 5/2023 Gehrung
2023/0173515 A1 6/2023 Gehrung
2023/0271202 A1 8/2023 Dettlaff
2023/0278050 A1 9/2023 Dettlaff
2023/0286000 A1 9/2023 Dettlaff

FOREIGN PATENT DOCUMENTS

CN 1723088 A 1/2006
CN 1909970 A 2/2007
CN 1917960 A 2/2007
CN 300700565 10/2007
CN 101188960 A 5/2008
CN 101856639 A 10/2010
CN 201702089 U 1/2011
CN 302042040 S 8/2012
CN 203342980 U 12/2013
CN 203342981 U 12/2013
CN 204710607 U 10/2015
CN 107690357 A 2/2018
CN 207188095 U 4/2018
CN 108745690 A 11/2018
CN 109070113 A 12/2018
CN 208711972 U 4/2019
CN 208824797 U 5/2019
CN 110252563 A 9/2019
CN 209997827 U 1/2020
CN 209997846 U 1/2020
CN 111389608 A 7/2020
CN 212418369 U 1/2021
CN 212441781 U 2/2021
CN 306409970 S 3/2021
CN 212951930 U 4/2021
CN 213435249 U 6/2021
CN 306692658 S 7/2021
CN 213967319 U 8/2021
CN 214021611 U 8/2021
CN 214183647 U 9/2021
CN 214183730 U 9/2021
CN 214347419 U 10/2021
CN 307123783 S 2/2022
CN 307187974 S 3/2022
CN 307446605 S 3/2022
CN 307231888 S 4/2022
CN 307381847 S 6/2022
CN 307382238 S 6/2022
CN 217043051 U 7/2022
CN 307456884 S 7/2022

(56) References Cited

FOREIGN PATENT DOCUMENTS

| | | | |
|---|---|---|---|
| CN | 217450601 | U | 9/2022 |
| CN | 307525222 | S | 9/2022 |
| CN | 307525223 | S | 9/2022 |
| CN | 307525224 | S | 9/2022 |
| CN | 307525228 | S | 9/2022 |
| CN | 307525229 | S | 9/2022 |
| CN | 307525230 | S | 9/2022 |
| CN | 307525231 | S | 9/2022 |
| CN | 307554049 | S | 9/2022 |
| CN | 307554055 | S | 9/2022 |
| CN | 307629829 | S | 11/2022 |
| CN | 307645760 | | 11/2022 |
| CN | 307816807 | S | 1/2023 |
| CN | 307903137 | S | 3/2023 |
| CN | 307903138 | S | 3/2023 |
| CN | 116620706 | A | 8/2023 |
| CN | 116967040 | A | 10/2023 |
| CN | 308254869 | S | 10/2023 |
| CN | 308254870 | S | 10/2023 |
| CN | 219970514 | U | 11/2023 |
| CN | 308662539 | | 5/2024 |
| CN | 308923161 | S | 11/2024 |
| CN | 119216129 | A | 12/2024 |
| CN | 222267499 | | 12/2024 |
| CN | 119588550 | A | 3/2025 |
| DE | 8024829 | U1 | 8/1982 |
| DE | 3242306 | A1 | 5/1984 |
| DE | 3402097 | A1 | 8/1985 |
| DE | 3517122 | C1 | 5/1986 |
| DE | 8813520 | U1 | 12/1988 |
| DE | 8815639 | U1 | 2/1989 |
| DE | 8902223 | U1 | 4/1989 |
| DE | 3815327 | A1 | 11/1989 |
| DE | 29702206 | U1 | 3/1997 |
| DE | 20202123 | U1 | 2/2003 |
| DE | 10213715 | A1 | 5/2003 |
| DE | 202004002445 | U1 | 6/2005 |
| DE | 202004002563 | U1 | 6/2005 |
| DE | 202004003116 | U1 | 7/2005 |
| DE | 202004003376 | U1 | 7/2005 |
| DE | 10 2004 003 439 | A1 | 8/2005 |
| DE | 102004007733 | A1 | 9/2005 |
| DE | 102004021298 | A1 | 11/2005 |
| DE | 202004014049 | U1 | 1/2006 |
| DE | 102006029802 | A1 | 3/2007 |
| DE | 202005020437 | U1 | 5/2007 |
| DE | 602004002475 | T2 | 6/2007 |
| DE | 102005063001 | A1 | 7/2007 |
| DE | 202006018491 | U1 | 4/2008 |
| DE | 202007001832 | U1 | 6/2008 |
| DE | 102007039106 | B4 | 2/2009 |
| DE | 202008014389 | U1 | 4/2010 |
| DE | 202009007151 | U1 | 10/2010 |
| DE | 102010012541 | A1 | 12/2010 |
| DE | 102009034715 | A1 | 1/2011 |
| DE | 102011008316 | A1 | 3/2012 |
| DE | 202014102561 | U1 | 7/2014 |
| DE | 10 2004 018 140 | A1 | 7/2015 |
| DE | 202015003663 | U1 | 9/2016 |
| DE | 102015006483 | A1 | 11/2016 |
| DE | 202017002680 | U1 | 8/2018 |
| DE | 102020109488 | A1 | 10/2021 |
| DE | 102020124381 | A1 | 3/2022 |
| EM | 000716527-0001 | | 5/2007 |
| EM | 000716527-0002 | | 5/2007 |
| EM | 000716527-0003 | | 5/2007 |
| EM | 000716527-0006 | | 5/2007 |
| EP | 1424135 | A1 | 6/2004 |
| EP | 1658143 | A2 | 5/2006 |
| EP | 1975079 | A1 | 10/2008 |
| EP | 1990099 | A1 | 11/2008 |
| EP | 2027931 | B1 | 2/2009 |
| EP | 2277628 | A2 | 1/2011 |
| EP | 2669213 | A1 | 12/2013 |
| EP | 2982443 | A1 | 2/2016 |
| EP | 3 053 656 | A1 | 8/2016 |
| EP | 3 078 426 | A1 | 10/2016 |
| ES | 2594332 | | 12/2016 |
| FR | 2968581 | A1 | 6/2012 |
| FR | 2982250 | A1 | 5/2013 |
| JP | 7063814 | B2 | 5/2022 |
| KR | 20150065665 | A | 6/2015 |
| WO | 2001/40102 | A1 | 6/2001 |
| WO | 2005/018815 | A2 | 3/2005 |
| WO | 2005/070557 | A1 | 8/2005 |
| WO | 2005/077543 | A1 | 8/2005 |
| WO | 2006098623 | A1 | 9/2006 |
| WO | 07/003245 | A1 | 1/2007 |
| WO | 2007/079188 | A2 | 7/2007 |
| WO | 2009/054986 | A1 | 4/2009 |
| WO | 2009090273 | A1 | 7/2009 |
| WO | 2010/044864 | A1 | 4/2010 |
| WO | 2011/047876 | A2 | 4/2011 |
| WO | 2011/090857 | A1 | 7/2011 |
| WO | 2012/009284 | A2 | 1/2012 |
| WO | 2013/131626 | A1 | 9/2013 |
| WO | 2013/134182 | A1 | 9/2013 |
| WO | 2013/165556 | A1 | 11/2013 |
| WO | 2017/146993 | A1 | 8/2017 |
| WO | 2018/019412 | A1 | 2/2018 |
| WO | 2019/162397 | A1 | 8/2019 |
| WO | 20/006861 | A1 | 1/2020 |
| WO | 2021/028401 | A1 | 2/2021 |
| WO | 2021/204885 | A1 | 10/2021 |
| WO | 2021/205236 | A1 | 10/2021 |
| WO | 2022/023465 | A1 | 2/2022 |
| WO | 2022/023466 | A1 | 2/2022 |
| WO | 2022/023467 | A1 | 2/2022 |
| WO | 2022/023468 | A1 | 2/2022 |
| WO | 22/218119 | A1 | 10/2022 |
| WO | 23/035890 | A1 | 3/2023 |
| WO | 23/061205 | A1 | 4/2023 |
| WO | 226675 | | 4/2023 |

OTHER PUBLICATIONS

For PCT/EP2016/000809: International Preliminary Report on Patentability, dated Nov. 28, 2018 Written Opinion, dated Aug. 4, 2016 International Search Report, dated Jul. 14, 2016.
International Search Report and Written Opinion for PCT/EP2021/71254, filed Jul. 29, 2021.
International Search Report and Written Opinion for PCT/EP2021/71252, filed Jul. 29, 2021.
International Search Report and Written Opinion for PCT/EP2021/71255, filed Jul. 29, 2021.
International Search Report and Written Opinion for PCT/EP2021/71253, filed Jul. 29, 2021.
Search Report for DE 10 2020 120 226.1, dated Dec. 22, 2020.
Search Report for DE 10 2020 120 229.6, dated Dec. 22, 2020.
Search Report for DE 10 2020 120 228.8, dated Dec. 22, 2020.
Search Report for DE 10 2020 120 231.8, dated Dec. 22, 2020.
English translation of Written Opinion for PCT/EP2021/059080, filed Apr. 7, 2021.
English translation of Written Opinion for PCT/IB2021/000373 filed Apr. 7, 2021.
International Preliminary Report on Patentability dated Jan. 31, 2023, with Written Opinion, for PCT/EP2021/071254, filed Jul. 29, 2021.
International Preliminary Report on Patentability dated Jan. 31, 2023, with Written Opinion, for PCT/EP2021/071252, filed Jul. 29, 2021.
International Preliminary Report on Patentability dated Jan. 31, 2023, with Written Opinion, for PCT/EP2021/071255, filed Jul. 29, 2021.
International Search Report and Written Opinion for PCT/IB2021/000373, filed Apr. 7, 2021.
Search Report dated Sep. 26, 2020, for German Patent Application No. 10 2020 109 914.2.
International Search Report and Written Opinion for PCT/EP2021/059080, filed Apr. 7, 2021.

(56) References Cited

OTHER PUBLICATIONS

Search Report dated Sep. 18, 2020, for German Application No. 10 2020 109 913.4.
For U.S. Appl. No. 29/510,723: Restriction Requirement dated Nov. 3, 2015 Response filed Jan. 4, 2016 Notice of Allowance dated Jan. 27, 2016.
Office Action dated Dec. 16, 2024 for U.S. Appl. No. 17/917,619.
Notification of the First Office Action dated Apr. 30, 2025 for Chinese Application No. 2021800588295 filed Jul. 29, 2021 and Search Report.
Final Office Action dated Sep. 2, 2025 for U.S. Appl. No. 17/917,641.
Final Office Action for U.S. Appl. No. 17/917,619 dated May 15, 2025.
For Chinese Application No. 2021800585545: First Office Action dated Apr. 23, 2025 Search Report dated Jul. 29, 2021 with English translation.
Or U.S. Appl. No. 18/017,910: Office Action dated Feb. 14, 2025 Response filed Jun. 16, 2025 Final Office Action dated Aug. 19, 2025.
Second Office Action dated Nov. 19, 2025 for Chinese Application No. 2021800588295 filed Jul. 29, 2021.
For U.S. Appl. No. 18/017,918: Notice of Allowance f dated Jan. 28, 2026 Supplemental Notice of Allowance dated Feb. 11, 2026.
For Chinese Patent Application No. 2021800584932: Second Office Action dated Oct. 28, 2025.
For Chinese Patent Application No. 2021800264648: First Office Action dated Nov. 15, 2025.
For Chinese Patent Application No. 2021800585545: Second Office Action dated Oct. 11, 2025.
For U.S. Appl. No. 17/917,641: Interview Summary daled Dec. 5, 2025 Response filed Jan. 2, 2026.
For U.S. Appl. No. 18/017,910; Interview Summary dated Nov. 28, 2025.
Office Action dated Oct. 21, 2025 for U.S. Appl. No. 18/017,933.
For U.S. Appl. No. 17/917,619: Notice of Allowance (dated Oct. 10, 2025) and Corrected Notice of Allowance (dated Oct. 21, 2025).
For Chinese Patent Application No. 2021800584932: Notification of the First Chinese Office Action dated Apr. 18, 2025 Search Report dated Apr. 16, 2025.
Ex parte Quayle Office Action dated Mar. 5, 2026 for U.S. Appl. No. 29/952,685.
Office Action dated Mar. 9, 2026 for U.S. Appl. No. 18/017,910.

* cited by examiner

FLUID RESERVOIR FOR A SPRAY GUN WITH A SCREW CAP

FIELD OF THE INVENTION

The invention relates to a flow cup for a spray gun, which has a material outlet which is embodied for direct and/or indirect connection to a spray gun, the flow cup having a material container and a screw cover that closes the material container, a peripheral region of the material container while configuring a screw connection to be disposed in a receptacle groove on the cover for the releasable and fluid-tight connection of material container and cover.

Furthermore, the invention relates to a screw cover or a material container of a flow cup of this type.

BACKGROUND

A flow cup according to the type mentioned at the outset is disclosed in WO2009/090273 A1, for example. The cup described therein has a material container and a cover with which the material container can be closed. In order to use the cup with a spray gun, the material container is first filled with a coating material to be applied. The material container filled with the coating material is subsequently closed by means of the cover. For this purpose, the cover is placed on the material container, with the upper periphery of the material container being introduced into a receptacle groove in the cover. The flow cup known from WO2009/090273 A1 is a cup with a screw cover, i.e. the cover is attached to the material container by a rotating movement. A screw connection holds the cover on the material container, a fluid-tight connection between material container and cover being produced after screw-fitting.

The flow cup has a material outlet. In the case of WO2009/090273 A1, the material outlet is provided on the cover. This is a so-called upside-down flow cup, which is mounted on the spray gun with the cover facing down. The coating material can flow from the material container, through the material outlet on the cover, into the spray gun due to the effect of gravity. In the case of compressed-air atomizing spray guns, the coating material is additionally suctioned from the cup to the nozzle by negative pressure generated at the atomizing nozzle.

The fact that the periphery of the container is disposed in the receptacle groove in the cover results in a robust and tight connection between the cover and the container. This is particularly necessary by virtue of the high forces that during painting work arise e.g. by pivoting, tilting and moving back and forth of the assembly of the spray gun and the flow cup assembled on the latter.

In this context, it is also advantageous that the cover is embodied as a screw cover, since a screw connection, in contrast to a snap-fit connection, for example, is distinguished by a high degree of robustness against lateral forces due to impacts or very rapid pivoting movements. Moreover, the assembly and disassembly of a snap-on cover entails vibrations of the cover and of the material container, which in turn increase the risk of uncontrolled, sudden detachment of paint residues from the surface of the cover or material container and associated spattering. A screw cover, on the other hand, can be repeatedly attached and removed in a uniform manner without vibrations.

Flow cups are consumables. Depending on the construction mode, the cups may indeed be used several times.

Nevertheless, a large number of cups are constantly consumed in paint shops. It is therefore a price-sensitive mass product.

SUMMARY OF THE INVENTION

One aspect of the invention relates to refining the known flow cup from the point of view of its suitability for cost-conscious mass production.

The flow cup according to the invention is characterized in that a central region of the screw cover, which adjoins the receptacle groove for the container periphery, is embodied as a continuation of a predominant part of the inner leg of the receptacle groove.

Unlike in the prior art, the inner leg of the receptacle groove is not embodied as a free-standing web or collar, but rather the central region of the screw cover transitions into the inner leg. At the other end, the inner leg preferably transitions into a central connecting web that forms the base of the receptacle groove. The central connecting web preferably in turn transitions into the outer leg of the receptacle groove.

The design embodiment of the inner leg according to the invention has considerable manufacturing advantages. Components of flow cups are advantageously produced from plastics material by an injection-molding method. In terms of the plastics injection-molding method, the invention is distinguished in that the liquid plastics stream is not divided at the transition from the central region of the screw cover to the receptacle groove when the injection-molding tool is being filled. Thanks to the invention, the region that is particularly sensitive to the functional reliability of the cover, specifically the receptacle groove, can be formed by a uniform (non-bifurcated) flow of liquid plastics material coming from the central region. This ensures that the injection-molding tool is filled quickly, uniformly and completely in this particularly critical peripheral region of the cover. As a result, the cycle times and also the wall thicknesses of the screw cover can be reduced without any loss of functionality, which in turn leads to overall cost and material savings.

Independently of the production method, the invention also leads to an increase in functional reliability or allows a reduction in wall thickness and thus material savings. Since the inner leg of the receptacle groove is not embodied to be free-standing, but rather its end is connected to the central region of the cover, the inner leg is supported or stiffened by the central region of the cover, which in turn allows the wall thickness to be reduced while maintaining or even increasing stiffness.

In order to obtain the advantages according to the invention, the central region does not have to be attached to the end of the inner leg (even if this is particularly preferable). The advantages of the invention are indeed derived to a reduced degree, but still to a considerable degree, if a major part of the inner leg, e.g. more than 50%, preferably more than 75%, more preferably 95% of the total length of the inner leg (spacing from the base of the groove to the outer edge of the inner leg) is embodied as a continuation of the central region. Conversely, this means that less than 50%, preferably less than 25%, more preferably 5% of the total length of the inner leg is configured as a free-standing or projecting collar, rib, bead, lip, etc.

In the case of a particularly preferred embodiment, the central region of the cover adjoins the receptacle groove by way of an annular portion which extends at least almost perpendicularly to the receptacle groove. This constructive measure reinforces the explained supporting effect of the inner leg by the central region.

Preferably, the at least almost perpendicular annular portion is followed by an annular portion of the central region, which runs at least almost parallel to the inner leg, specifically in such a manner that a further groove is formed, but said groove is open in the opposite direction of the receptacle groove. A compensating ring groove is formed by the further groove, and the desired support or rigidity of the inner leg can be defined via the dimensioning of this groove.

For reasons of stability and stiffness, a refinement of the invention is preferred in which the peripheral region of the material container, which for configuring the connection between the material container and the cover is to be disposed in the receptacle groove on the cover, is provided with an eversion which is preferably additionally reinforced by means of radial transverse ribs.

The transverse ribs preferably terminate so as to be at least almost flush with the outer (lower) periphery of the eversion.

In the case of a particularly preferred exemplary embodiment, the cover is embodied as a screw cover which is provided with at least one threaded element which with at least one corresponding threaded element on the material container forms a screw connection. The at least one threaded element on the cover and/or on the material container is preferably embodied as a threaded web or rib. A functionally reliable connection is guaranteed in this way and at the same time material accumulations can be avoided and minor wall thicknesses can be achieved in the region of the threaded elements.

If necessary, the threaded webs can be embodied with an angle profile to further increase the functional reliability of the connection.

It has proven successful in practice that for forming the screw connection an internal thread is provided on the cover and a corresponding external thread is provided on the material container.

A fixed screw connection that is bordered on both sides in the receptacle groove and thus well supported is obtained by disposing the at least one cover-proximal threaded element inside the receptacle groove.

In particular, the at least one threaded element of the cover is disposed on the inside of an outer leg of the receptacle groove and/or the at least one threaded element of the material container is disposed on the outside of an outer leg of an eversion of the peripheral region of the material container.

In terms of injection-molding, an exemplary embodiment of the invention in which the at least one threaded element, which is disposed inside the receptacle groove, transitions into the central connecting web of the receptacle groove, which forms the base of the receptacle groove, is advantageous. In this way, the threaded element or the threaded elements can be molded in the interior of the receptacle groove, for example, by an injection-molding tool with a rotary core.

The screw connection is preferably embodied as a multi-threaded screw connection.

In particular, an exemplary embodiment in which a plurality of, in particular four, threaded webs of the same type are provided both on the cover side and on the material container side, is preferable. The cover-proximal threaded webs, for example, are provided inside the receptacle groove and preferably all transition into the base of the groove. Advantageously, these threaded webs can overlap in the circumferential direction, with the threaded webs running axially offset from one another in the overlapping region.

In the case of a particularly preferred exemplary embodiment, the cover in the closed state of the flow cup encompasses the material container, in particular said cover completely (axially and/or radially) encompasses an eversion of the peripheral region of the material container.

High demands are placed on the sealing of the connection between the cover and material container of a flow cup. With the flow cup, different coating materials are processed, sometimes with significant amounts of solvent. The seal must reliably prevent even small amounts of material from escaping, even if the coating material is stored for a longer period of time and internal pressure builds up in the flow cup. The sealing effect must be guaranteed at all times, even if the flow cup is opened and closed repeatedly and the seal is contaminated with the coating material (paint) it contains.

In view of the high requirements, an exemplary embodiment in which the fluid-tight sealing between the cover and the material container takes place by way of components bearing in an encircling tight manner in the interior of the receptacle groove is particularly preferable.

The fluid-tight sealing between the cover and the material container is preferably achieved by the components bearing in an encircling sealing radial and/or axial manner.

In the case of a particularly preferred exemplary embodiment, the fluid-tight sealing between the cover and the material container is implemented by bearing in an encircling sealing manner on the outside of the inner leg of the receptacle groove and/or by bearing in an encircling sealing manner on the central connecting web of the receptacle groove, which forms the base of the receptacle groove.

One or more encircling sealing beads, ribs, lips etc. on at least one of the contact surfaces on the cover and/or on the material container can further increase the sealing effect and its functional reliability. A variant in which a plurality of axially offset, encircling sealing beads are provided on the outside of the inner leg of the receptacle groove, which bear in a sealing manner against the inside of the material container, in particular in the region of the eversion, is particularly preferable. The sealing beads, ribs, lips, etc. can also be formed on the base of the receptacle groove (central connecting web), inside of the outer leg, the inside or outside of the eversion and/or its end side.

The stability of the cover/material container connection and optionally the functional reliability of the seal is increased in a preferred exemplary embodiment in that, when the container periphery is inserted into the receptacle groove, at least the peripheral region of the material container expands on the outside of the inner leg of the receptacle groove.

In the case of a particularly preferred exemplary embodiment, the connection between the cover and the material container is embodied in such a way that if the components swell under the influence of the coating material contained in the flow cup, the sealing effect between the cover and the material container is reinforced. The swelling results in particular from the penetration of solvents into the material of the cover or container. The cover material can show a different swelling behavior than the container material in the process. This in turn can result in the sealing effect between the cover and the container decreasing due to the swelling, as a result of which the dimensions of the components bearing on one another change. A particularly preferred refinement of the invention reduces the risk of swelling in that the cup periphery (in particular the eversion) is firmly enclosed or clamped radially on the inside and outside in the receptacle groove on the cover. Furthermore, the already mentioned expansion of the cup periphery on the outside of the inner leg of the receptacle groove counteracts a reduction in the sealing effect due to swelling.

The flow cup according to the invention is preferably an extremely thin-walled product. Thus, the wall thickness of the material container is in the range from 0.55 mm to 0.65 mm, for example, preferably is 0.60 mm, and/or the wall thickness of the screw cover is in the range from 0.75 mm to 0.85 mm, for example, preferably is 0.80 mm.

The flow cup is preferably embodied as a "standard flow cup", i.e. the central region of the cover is closed, apart from any ventilation device or similar that may be present, and/or the material container is cup-shaped with a base, the base being provided with a (funnel-shaped) material outlet.

In the case of a particularly preferred embodiment, the flow cup is embodied as an upside-down flow cup. The removable screw cover is provided with a material outlet for mounting on a spray gun, which preferably comprises a tubular outlet port, and/or the base of the cup-shaped material container is configured in such a manner that the material container can be placed on a flat surface with the base downward for filling and any mixing, without any additional tools.

In a particularly preferred exemplary embodiment, the central region of the screw cover has a funnel-shaped section and/or the central region of the screw cover has an outlet port, which in turn can preferably be connected directly or indirectly to a spray gun.

As already mentioned, the cover and the material container are preferably made of plastic in an injection-molding method. It is particularly advantageous if the cover and/or the material container are produced as integral plastic injection-molded parts. It goes without saying that the cover and the material container are also to be regarded as an integrally produced component if individual smaller components are produced separately. For example, it has proven useful in practice not to manufacture sieve elements, (movable) valve bodies, caps, etc. integrally with the cover or the material container. However, this is entirely conceivable and technically feasible.

In order to enable pressure equalization in the material container when the coating material flows out, a ventilation device is provided in variants of the invention. The ventilation device can be disposed in the cover or in the material container, preferably in the base of the material container.

The invention is further implemented by a screw cover or a material container embodied for use as part of a flow cup having the features described above and below.

BRIEF DESCRIPTION OF THE DRAWINGS

The invention will be explained hereunder by means of exemplary embodiments. In the figures.

DETAILED DESCRIPTION

Figure 1:
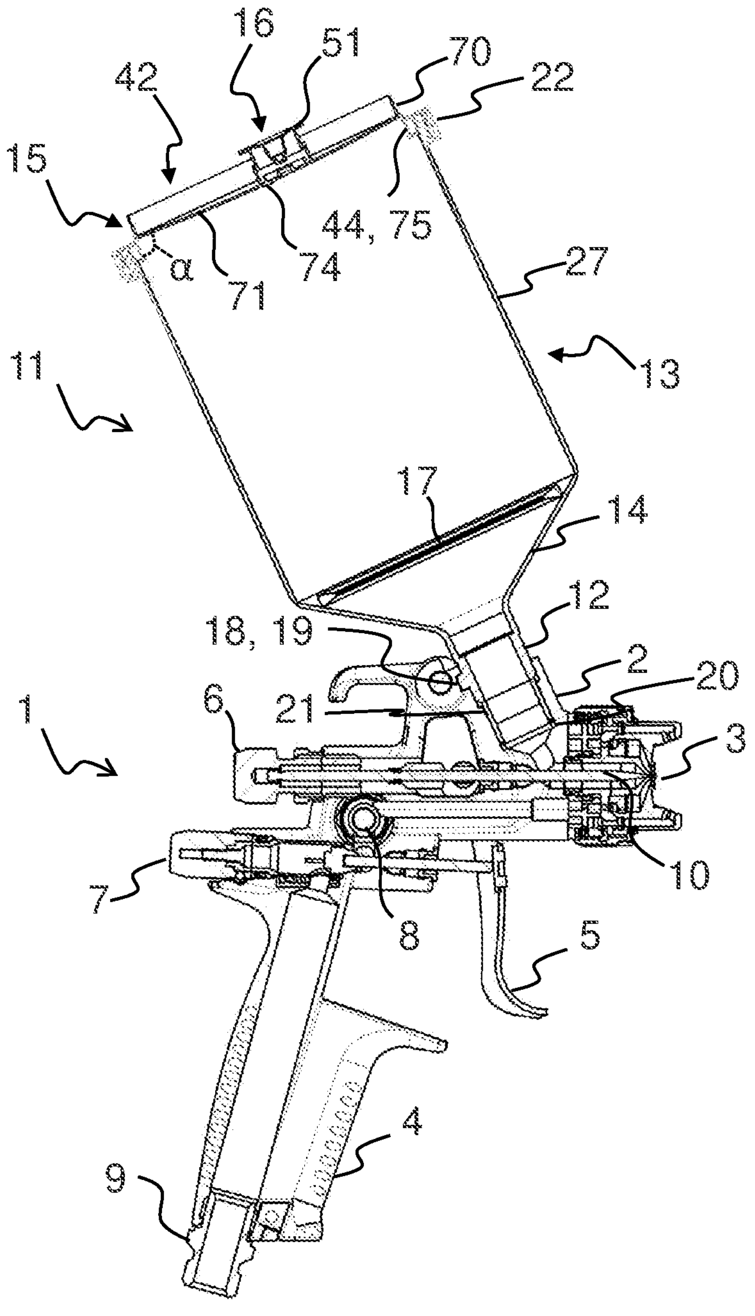
FIG. 1 shows a sectional view of a spray gun with a flow cup according to a first exemplary embodiment of the invention.

FIG. 1 shows a hand-held spray gun 1 for the compressed-air assisted atomization and application of a free-flowing coating material. The spray gun 1 can be configured, for example, as a so-called high-pressure, compliant or HVLP spray gun 1. The spray gun 1 has a cup connector 2 and a nozzle head 3 at which the coating material supplied to the spray gun 1 via the cup connector 2 is atomized and emerges in the form of a spray jet.

Furthermore, the spray gun 1 comprises a handle 4, a trigger 5 for actuating a material needle 10 disposed inside the spray gun 1, an adjustment mechanism 6 for the stroke of the material needle (material quantity regulation), an air pressure adjustment device 7 (micrometer), a round/broad jet adjusting device 8 and a compressed air connection 9. By means of the round/broad jet adjustment device 8, the distribution of the compressed air supplied to e.g. an atomization and transport air on the one hand and a horn air for a wide beam formation on the other hand can be changed.

A flow cup 11 is connected to the cup connector 2 of the spray gun 1 by means of a material outlet configured as an outlet port 12. The flow cup 11 has a material container 13 on the base 14 of which the outlet port 12 is molded. Furthermore, the flow cup 11 comprises a screw cover 15 which closes the material container 13 and is provided with a ventilation device 16. The ventilation device 16 enables pressure equalization when coating material flows out of the flow cup 11 via the outlet port 12. Inside the material container 13 there is a sieve element 17 through which the coating material must pass before it can leave the material container 13 via the outlet port 12.

The outlet port 12 is equipped with connection means in the manner of a bayonet lock, which include a clamping wedge element 18 protruding radially from the outlet port 12. The clamping wedge element 18 engages in a corresponding receptacle groove 19 on the spray gun 1. The outlet port 12 seals axially e.g. by means of its end side 20 on the cup connector 2 and/or radially with the aid of two circumferential radial sealing lips 21 (barely visible in FIG. 1 due to the proportions, see also FIG. 10).

The flow cup 11 according to FIG. 1 is embodied as a standard flow cup.

Figure 2:
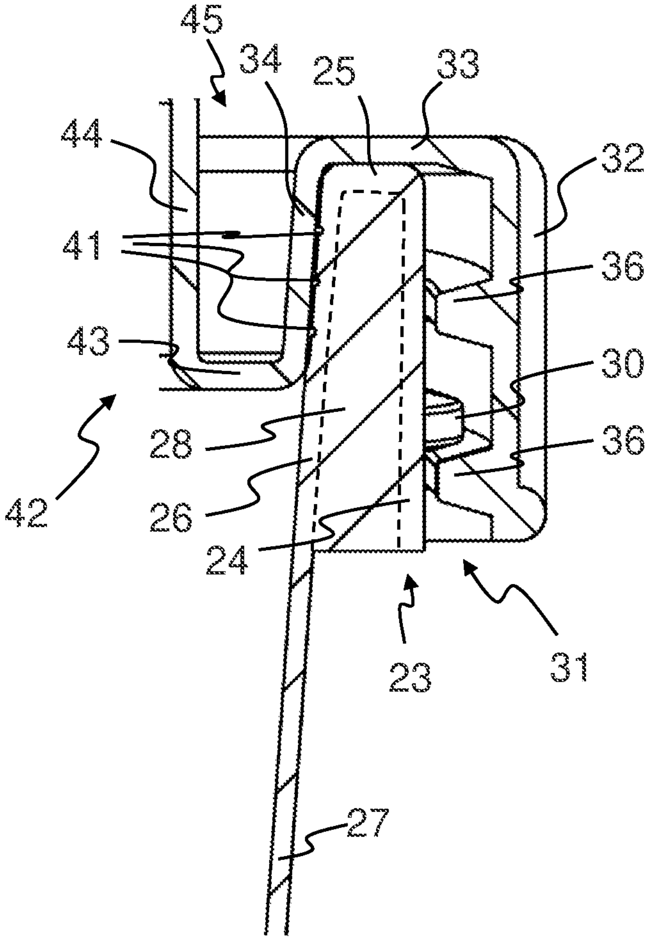
FIG. 2 shows a partial sectional view of the flow cup according to FIGS. 1 and 9 in the region of the connection between the cover and the material container of the flow cup.

The screw connection 22 between the screw cover 15 and the material container 13 is described in detail below with reference to FIG. 2. FIG. 2 shows an enlarged section of the flow cup 11 according to FIGS. 1 and 9 in the region of the connection point between screw cover 15 and material container 13.

The peripheral region of the material container 13 is provided with an eversion 23 which is reinforced by means of a plurality of radial transverse ribs 28. The transverse ribs 28 terminate almost flush with the outer periphery of the eversion 23. Alternatively, the transverse ribs 28 can also be embodied lower and in the eversion 23 set back somewhat in relation to the outer periphery of the eversion 23.

The eversion 23 has an outer leg 24, a central connecting web 25 and an inner leg 26. The inner leg 26 transitions into a circumferential wall 27 of the material container 13. A section through a radial transverse rib 28, which is molded so as to be integral to the outer and the inner leg 24, 26 and the central connecting web 25 is shown in FIG. 2. The dotted lines in FIG. 2 indicate the profile of the outer and inner leg 24, 26 and of the central connecting web 25.

Figure 12:
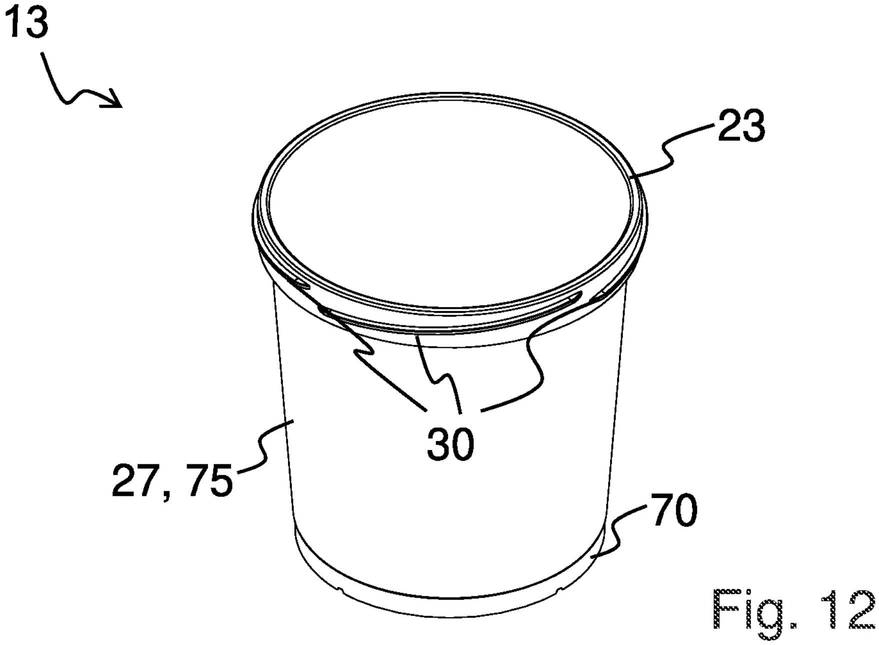
FIG. 12 shows a perspective view of the material container of the flow cup according to FIG. 9.

Four threaded elements in the form of threaded webs 30 are provided on the outside of the outer leg 24 of the eversion 23. The threaded webs 30 are structurally identical to the threaded webs 30 shown in FIG. 12. FIG. 12 shows the material container 13 of a second exemplary embodiment of a flow cup 11, which will be described in more detail later, but whose screw connection 22 is of identical design and is therefore also shown in FIG. 2.

The peripheral region of the screw cover 15 has a receptacle groove 31 which is likewise formed by an outer leg 32, a central connecting web 33 and an inner leg 34. In the closed state of the flow cup 11, the receptacle groove 31 encompasses the eversion 23 in the peripheral region of the material container 13.

Inside the receptacle groove 31, more precisely on the inside of the outer leg 32, four threaded webs 36 are formed, which conjointly with the threaded webs 30 on the material container 13 form the multi-threaded screw connection 22. All four threaded webs 36 begin approximately at the lower periphery of the outer leg 32 and open into the central connecting web 33 which forms the base of the receptacle groove 31. The threaded webs 36 therefore partially overlap in the circumferential direction, but are axially offset from one another in the overlapping region. This can also be seen from FIG. 2, which shows two threaded webs 36 lying axially one above the other and overlapping in the circumferential direction. This can be seen even more clearly in FIG. 11, which shows a sectional illustration through the screw cover 15 of the second exemplary embodiment, in which the screw connection 22, as already mentioned, is of identical embodiment.

The fluid-tight sealing between screw cover 15 and material container 13 is performed by radial and axial bearing in an encircling sealing manner in the inside of the receptacle groove 31. Specifically, the radial sealing occurs between the outside of the inner leg 34 of the receptacle groove 31 and the inside of the inner leg 26 of the eversion 23 of the material container 13. The axial sealing takes place between the upper side of the central connecting web 25 of the eversion 23 and the lower side of the central connecting web 33 of the receptacle groove 31.

In an exemplary embodiment that is not shown, analogously to the exemplary embodiment according to FIG. 2, radial sealing can take place between the outside of the inner leg 34 of the receptacle groove 31 and the inside of the inner leg 26 of the eversion 23 of the material container 13, but instead of the additional axial sealing, no, or radial sealing (and supporting) between the inside of the outer leg 32 of the receptacle groove 31 and the outside of the outer leg 24 of the eversion 23 of the material container 13 may take place. The second radial sealing and, if necessary, supporting action can preferably take place near the corner region at the transition from the outer leg 24 to the central connecting web 25 of the eversion 23.

In a further exemplary embodiment that is not shown, analogously to the exemplary embodiment according to FIG. 2, radial sealing can be provided between the outside of the inner leg 34 of the receptacle groove 31 and the inside of the inner leg 26 of the eversion 23 of the material container 13, wherein the sealing action takes place along an encircling and almost linear bearing action between the outside of the inner leg 34 of the receptacle groove 31 and the inside of the inner leg 26 of the eversion 23 of the material container 13 in the region of the lower end of the inner leg 34 of the receptacle groove 31. Additional axial sealing analogously to the exemplary embodiment according to FIG. 2 may or may not be provided in this embodiment. By way of example, three encircling sealing ribs 41 are shown in FIG. 2, which are molded on the outside of the inner leg 34 of the receptacle groove 31 and lead to a further reinforcement of the sealing effect. Moreover, the sealing effect is improved in that the inner diameter of the material container 13 in the upper peripheral region is selected in such a manner that the material container 13 is expanded when the screw cover 15 is installed, at least in the region of the eversion 23, and this results in a particularly strong and sustained radial compression between the screw cover 15 and material container 13.

It goes without saying that, alternatively or additionally, further sealing ribs, lips, beads can also be formed at other points in order to increase the sealing effect. Alternatively, for example, only an axial or only a radial sealing can take place between the screw cover 15 and the material container 13.

A central region 42 of the screw cover 15 is embodied as a continuation of the inner leg 34 of the receptacle groove 31. In FIG. 2 only an outer portion of the central region 42 of the screw cover 15 is shown. In particular, the inner leg 34 is followed by a first annular portion 43 of the central region 42 which extends at least almost perpendicularly to the receptacle groove 31. The annular portion 43 is followed by a second annular portion 44 of the central region 42 which runs at least almost parallel to the inner leg 34, specifically in such a manner that a compensating ring groove 45 is formed which is open in the opposite direction to the receptacle groove 31. By means of the compensating ring groove 45 e.g. manufacturing tolerances of the components can be compensated, in particular to ensure the functionality, strength and tightness of the screw connection 22. Moreover, a desired support or stiffness of the inner leg 34 can be defined via the dimensioning of the compensating ring groove 45.

As can be seen from FIG. 1, the central region 42 of the screw cover 15 in the case of the exemplary embodiment according to FIG. 1 is provided with a ventilation device 16 which enables pressure equalization when coating materials flow out of the flow cup 11 by way of the opposite outlet port 12. The structure of the ventilation device 16 is explained below with reference to FIGS. 3 to 5, which show the ventilation device 16 in three different states, and explained in more detail in FIGS. 6 and 7.

The ventilation device 16 is embodied as a snap-in valve. It comprises a movable cap-shaped closure element 51 with a cap plate 52 from which a hollow collar 53 and a central hollow protuberance project. The hollow protuberance forms a hollow closure plug 55 which protrudes axially relative to the hollow collar 53 by a distance which corresponds at least almost to the wall thickness of the flow cup 11 in the region of the ventilation device 16 (see also FIG. 6).

The closure plug 55 is provided with an encircling shoulder 56 from which in turn an almost cylindrical plug tip 57 protrudes. The hollow collar 53 has first and second latching lugs 58, 59 which are axially offset relative to one another on the external circumference. The first and second latching lugs 58, 59 are spaced apart from one another in the circumferential direction, as a result of which air channels 60 are formed.

Figure 6:
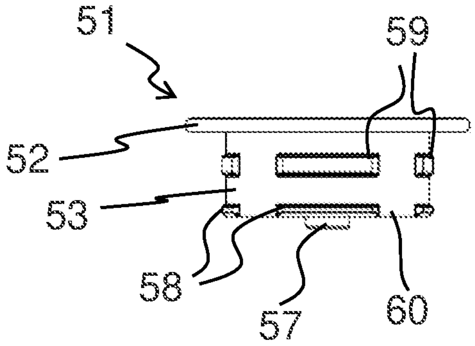
FIGS. 6 and 7 show a perspective and a lateral view of the closure element of the ventilation device of the flow cup according to FIGS. 1 and 9.
Figure 7:
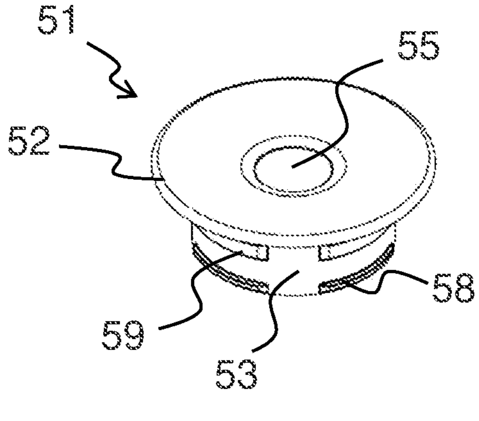

The construction of the closure element 51 is shown in particular in FIGS. 6 and 7, which show the closure element 51 in a lateral view and a perspective top view.

On the outside of the flow cup 11, the ventilation device 16 has a ventilation opening 61 and three hollow collars disposed concentrically to the ventilation opening 61. The outer hollow collar 62 is provided on its open end side with an introduction chamfer 63 for the closure element 51 and a subsequent encircling latching edge 64 on the internal circumference. The central hollow collar 65 forms a separate centering, retaining and guiding device. On the open end side thereof, said central hollow collar 65 is provided with a centering chamfer 66 on the external circumference. The inner hollow collar 67 forms the periphery of the ventilation opening 61 and on its open end side is provided with a centering chamfer 68 on the internal circumference.

The outer hollow collar 62 projects from the outside of the flow cup 11 by approximately three to four times the amount compared to the other two hollow collars 65, 67. The central hollow collar 65 protrudes from the inner hollow collar 67 approximately by the amount by which the closure plug 55 projects from the hollow collar 53 on the closure element 51.

To assemble the ventilation device 16, the closure element 51 is introduced into the outer hollow collar 62, which is facilitated by the introduction chamfer 63. The closure element 51 can be attached and thus provided to the user separately from the flow cup 11 or e.g. via a tear-off tab, web, film hinge, etc. to the screw cover 15 or the material container 13 of the flow cup 11. The ventilation device 16 can also be already pre-assembled in the factory and delivered to the user in working order.

Figure 3:
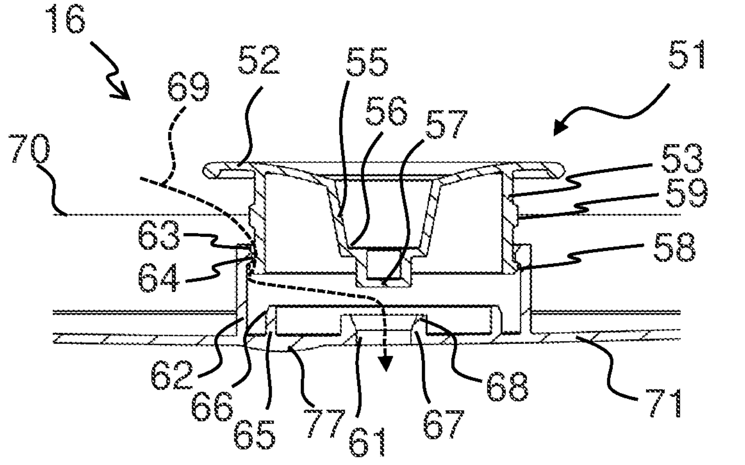
FIGS. 3 to 5 show partial sectional views of the flow cup according to FIGS. 1 and 9 in the region of the ventilation system in three different states.

In FIG. 3 the ventilation device 16 is shown in the maximum open position of the closure element 51. The first latching lugs 58 on the hollow collar 53, which is disposed on the closure element 51, engage behind the encircling latching edge 64 on the outer hollow collar 62 on the outside of the flow cup 11. Due to the interaction of the first latching lugs 58 and the encircling latching edge 64, the closure element 51 is captively attached to the flow cup 11. The frictional connection between the hollow collars 53, 62 prevents the closure element 51 from moving downwards from the maximum open position in FIG. 3 without an external force device or solely by the effect of gravity. Specifically, the first latching lugs 58 are embodied in such a way that they are compressed radially with the internal circumferential face of the outer hollow collar 62. But it is also conceivable that further latching means are formed, for example, in the form of a second circumferential latching edge below the front latching edge 64, which counteract an undesirable slipping and tilting of the closure element 51.

In the maximum open position shown, there is a certain amount of play between the peripheral latching periphery 64 on the outer hollow collar 62 and the outer circumferential face of the hollow collar 53, through which play air can enter the flow cup 11. The flow path, via which air from the outside gets into the interior of the flow cup 11 in order to ensure pressure equalization when coating material leaves the material container 13 via the outlet port 12, is sketched in FIG. 3 as a dashed arrow 69. After the inflowing air has passed the play or the gap formed thereby at the latching periphery 64, it flows between the first latching lugs 58 through the air channels 60 and finally through the ventilation opening 61 into the interior of the flow cup 11.

The constriction in the contact region of the outer hollow collar 62 and the hollow collar 53 has the advantage that even when the ventilation device 16 is in the open state, the coating material is prevented from escaping if it sloshes or sprays out of the flow cup 11 through the ventilation opening 61 during the spraying process.

In addition, it is also conceivable that the peripheral latching edge 64 with many smaller openings, i.e. segmented, is embodied so that the incoming air can flow through these openings and not (only) through the gap formed by the play between latching edge 64 and the outer circumferential face of hollow collar 53. In this case, play between the latching edge 64 and the outer circumferential face of the hollow collar 53 can also be completely dispensed with and the two components fit together at the point.

The closure element 51 and in particular the cap plate 52 project significantly beyond an outer circumferential periphery 70 of the flow cup 11. An exemplary configuration of the circumferential periphery 70 can be seen in FIG. 1.

Thanks to the protrusion, a user can clearly see when the ventilation device 16 is in the open state. Moreover, when the flow cup 11 is placed on the circumferential periphery 70 with the side equipped with the ventilation device 16 facing down and a user has failed to close the ventilation device 16 beforehand, the closure element 51 is automatically pushed in the direction of the closed position by the deposition surface on which the flow cup 11 is to be deposited. This prevents large quantities of the coating material from accidentally escaping. If the user places the (still) empty flow cup 11 with the ventilation device 16 open on the circumferential periphery 70, the flow cup 11 tilts back and forth due to the protruding cap plate 52, which advantageously draws the user's attention to the ventilation device 16 that is still open before he/she fills in the coating material.

Figure 4:
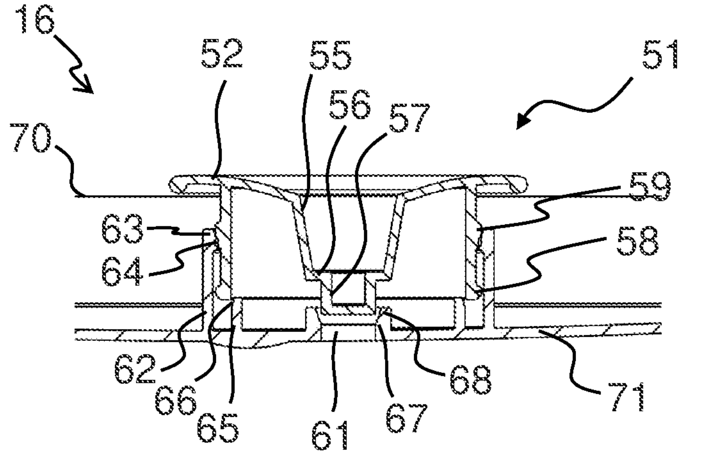

In order to close the ventilation device 16 in the usual way, a user presses on the cap plate 52, as a result of which the closure element 51 moves downwards in a straight line until it initially assumes the intermediate position according to FIG. 4. In the course of this first portion of the closing movement, the closure element 51 is guided by an interaction of the two hollow collars 53, 62. In particular, the closure element 51 is guided by the first latching lugs 58 sliding along the internal circumferential face of the outer hollow collar 62.

In the intermediate position according to FIG. 4, the second latching lugs 59 meet the latching periphery 64 on the outer hollow collar 62. At least almost simultaneously, the end side of the hollow collar 53 impacts the centering chamfer 66 on the central hollow collar 65 and the plug tip 57 hits the centering chamfer 68 on the inner hollow collar 67. The meeting at the three different points results in a precise and functionally reliable centering of the closure element 51 and in particular of the closure plug 55 before the closure plug 55 penetrates the ventilation opening 61 during the further closing movement.

Figure 5:
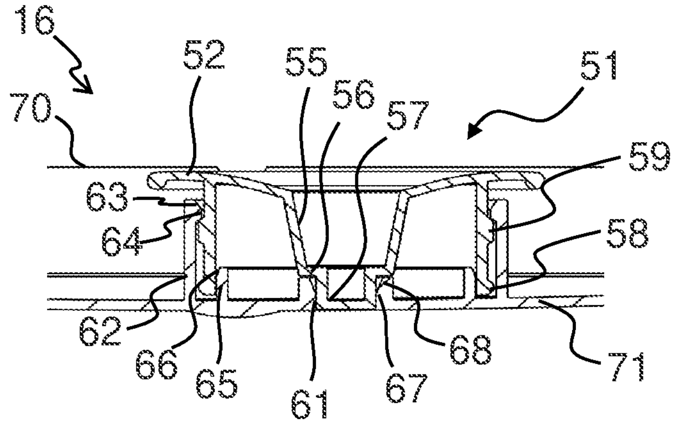

The last part of the closing movement follows, in which the closure element 51 is transferred from the intermediate position shown in FIG. 4 to the closed position shown in FIG. 5. In this movement portion, the closure element 51 is additionally guided by an interaction of the hollow collar 53 and the central hollow collar 65. Specifically, the internal circumferential face of the hollow collar 53 slides along the outer circumferential face of the central hollow collar 65. In this very delicate movement section, the closure element 51 is guided in a very robust and stable manner.

In FIG. 5 the closure element 51 assumes the closed end position. The closure plug 55 closes the ventilation opening 61. Said closure plug 55 bears in a sealing manner on the internal circumferential face of the opening 61. In this state, neither air can flow into the flow cup 11 via the ventilation device 16, nor can coating material escape from the flow cup 11 via the ventilation device 16.

The fact that the end side of the hollow collar 53 is disposed or enclosed in an annular space between the outer hollow collar 62 and the central hollow collar 65 also results in a type of labyrinth restraint device. As a result, in particular, coating material is held back that has entered the interspace between the inner and central hollow collars 67, 65 before the ventilation device 16 is closed, thus preventing said coating material from getting out into the environment.

In particular, the internal circumferential face of the hollow collar 53 can also bear circumferentially tightly against the outer circumferential face of the central hollow collar 65 so that an escape of coating material is counteracted even more effectively.

It can be seen from FIG. 5 that the shoulder 56 on the closure plug 55 rests on the end side of the inner hollow collar 67 in the closed end position, which defines the axial position of the closure element 51 in the closed end position. The defined axial stop ensures that the closure plug 55 does not penetrate too far into the interior of the flow cup 11 and does not protrude inward relative to the end wall 71.

Furthermore, it can be seen from FIG. 5 that the cap plate 52 is now set back from the circumferential periphery 70. The closure element 51 is held in a functionally reliable manner in the closed end position by an interaction of the second latching lugs 59 on the hollow collar 53 and the encircling latching edge 64 on the outer hollow collar 62.

In order to open the ventilation device 16 again, a user can grip the closure element 51 on the cap plate 52 and pull it upwards back into the maximum open position according to FIG. 3.

Figure 8:
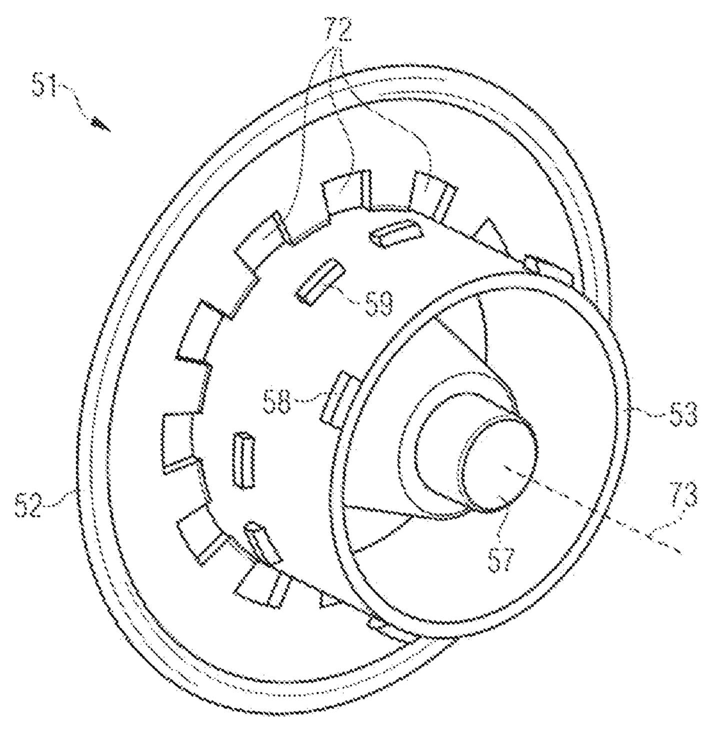
FIG. 8 shows a perspective view of an alternative embodiment of the closure element of the ventilation device of the flow cup according to FIGS. 1 and 9.

Shown in FIG. 8 is an alternative second embodiment of a closure element 51, which largely corresponds to the first embodiment, so that identical and similar components are given the same reference numbers. The second exemplary embodiment differs only in that the first and second latching lugs 58, 59 are disposed offset from one another not only axially but also in the circumferential direction. Each latching lug 58, 59 is assigned an overlying opening 72 in the cap plate 52. Thanks to these measures, the closure element 51 can be produced without forced demolding using a simple two-part injection molding tool, the tool parts of which are converged and diverged along the longitudinal axis 73 of the closure plug 55.

Figure 9:
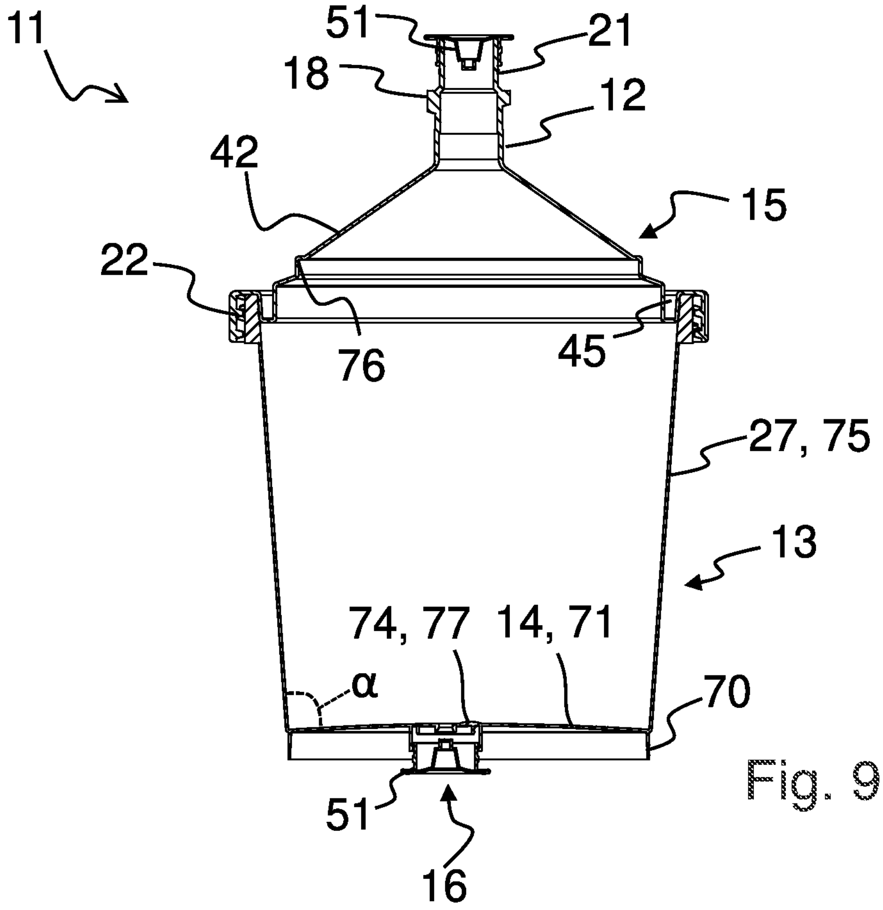
FIG. 9 shows a sectional view of a flow cup according to a second exemplary embodiment of the invention.

It can be seen from FIGS. 1 and 9 that the ventilation device 16 is disposed on the outside of the end wall 71 of the flow cup 11, which is provided with an indentation which extends evenly over the end wall 71.

The location 74 of the concave end wall 71, which protrudes furthest inward due to the concavity, has an offset of 1% to 4%, more precisely 2% to 3%, of the diameter of the end wall 71 relative to the outer periphery region of the end wall 71. In the embodiment shown, the diameter is e.g. d=84.6 mm and the offset e.g. V=2.0 mm.

A circumferential wall 75 of the flow cup 11 borders on the concave end wall 71. The surrounding wall 75 is closed by the concave end wall 71. The circumferential wall 75 is conical to such an extent that the concave end wall 71 (despite the concavity) adjoins the circumferential wall 75 at an angle $\alpha$ of greater than 90°. In the exemplary embodiments shown, an angle $\alpha$ of approximately 92° results.

Due to the proportions in FIG. 1, this can hardly be seen. For a better understanding, reference is therefore made to the exemplary embodiment shown in FIG. 9. The second embodiment will be explained in more detail below.

The exemplary embodiment of a flow cup 11 according to the invention shown in FIG. 9 and FIGS. 10 to 12 largely corresponds to the first exemplary embodiment, so that the same reference numbers are used for identical or similar components.

Overall, the flow cup 11 according to the second embodiment is embodied as an upside-down flow cup.

The flow cup 11 also has a screw cover 15 and a material container 13 which can be closed in a fluid-tight manner by means of the screw cover 15. In contrast to the first exemplary embodiment, the outlet port 12 is disposed on the screw cover 15 and the ventilation device 16 is disposed on the base of the material container 13. A sieve element receptacle 76 for a flat, disk-shaped sieve element (not shown) is provided in the screw cover 15, analogously to the sieve element 17 shown in FIG. 1. The disk-shaped sieve element is held in position by a holding lug, also not shown, on the screw cover 15. As an alternative to a flat sieve element, a cylindrical plug-in sieve can be used, which can be fixed in the outlet port 12 or in the cup connector 2 on the spray gun side. This also applies to the first exemplary embodiment according to FIG. 1.

Alternatively, the sieve elements can be fastened by direct welding or injection into the screw cover 15.

The connection means, by means of which the outlet port 12 can be assembled on a spray gun 1, correspond to the connection means on the outlet port 12 of the first exemplary embodiment, so that reference is made to the corresponding passages in the description of the figures.

The screw connection 22, the ventilation device 16 including the concave end wall 71 on which the ventilation device 16 is disposed also correspond in structure and function to that of the first exemplary embodiment of a flow cup 11, so that reference is also made to the relevant passages.

Based on FIGS. 9 to 12 it follows that the concave end wall 71 forms the base 14 of the cup-shaped material container 13. In the exemplary embodiment shown, the end wall 71 is produced in one piece with the circumferential wall 75 and the circumferential periphery 70 of the material container 13. Thanks to the conical design of the circumferential wall 75 of the material container 13 and the concavity of the end wall 71 forming the base 14, a plurality of material containers 13 can be stacked closely one inside the other.

From FIG. 9, which shows a sectional view of the entire flow cup 11, it can be seen that the closure element 51 of the ventilation device 16 can also serve as a closure element 51 for the outlet port 12. The same applies to the outlet port 12 of the first exemplary embodiment.

Figure 10:
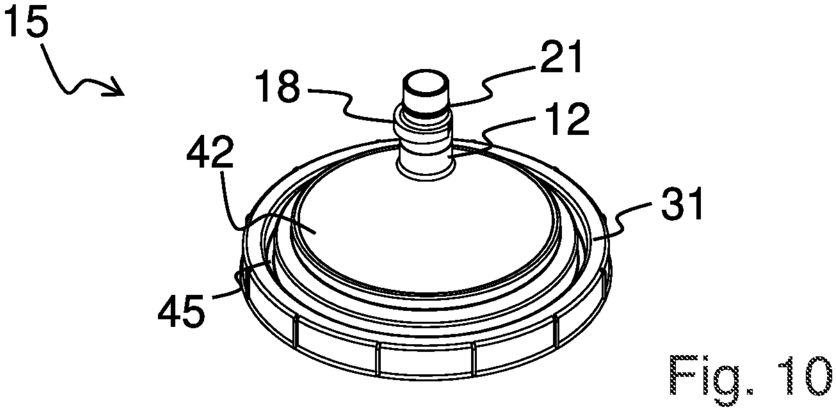
FIGS. 10 and 11 show a perspective and a sectional view of the cover of the flow cup according to FIG. 9.

In FIG. 10, which shows a perspective top view of the screw cover 15 without the closure element 51 on the outlet port 12, the compensating ring groove 45, which follows the receptacle groove 31 in the screw cover 15, and the connection and sealing means on the outlet port 12 in the form of the clamping wedge element 18 and the radial sealing lips 21 are clearly visible.

Figure 11:
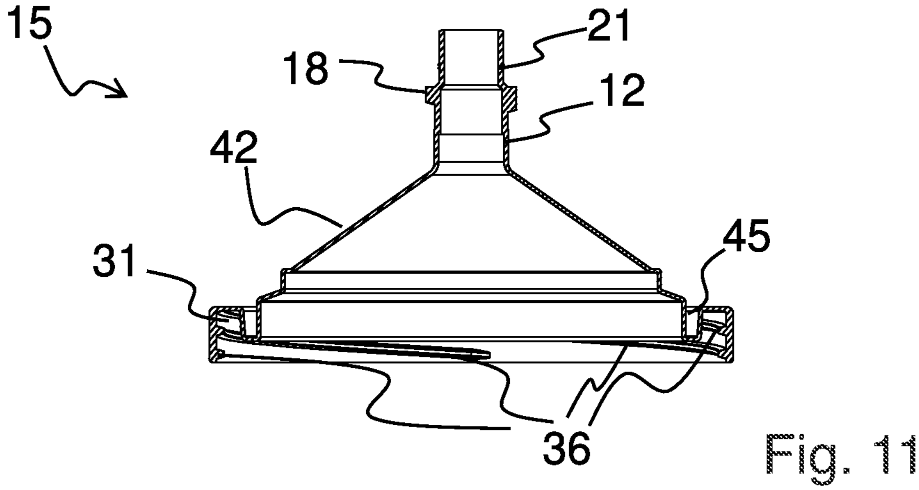

FIGS. 11 and 12 serve in particular to illustrate the formation of the threaded webs 30, 36 of the screw connection 22 between the screw cover 15 and the material container 13. As already explained, it is a multi-threaded screw connection 22. Four threaded webs 30, 36 are formed on both the cover and the container side. The threaded webs 36 on the cover are disposed in the receptacle groove 31 and each run from the lower periphery of the receptacle groove 31 to the base of the receptacle groove 31. The cover-side threaded webs 36 therefore partially overlap in the circumferential direction. The container-side threaded webs 30, on the other hand, do not overlap in the circumferential direction.

The flow cups 11 according to the first and second exemplary embodiment are preferably made of plastic in a plastic injection-molding method, with the screw cover 15 and the material container 13 being integrally molded—apart from the closure element 51 and the sieve elements 17.

In the case of an exemplary embodiment that is not shown, one or more closure elements 51 and/or one or more sieve elements 17 can also be produced in one piece with the screw cover 15 or the material container 13. For example, they can be attached at any point by tear-off webs, tabs, film hinges, etc., which can be severed in order to assemble the elements elsewhere.

The material containers 13 are made of polypropylene (PP), for example, and the screw covers 15 are made of, for example hard polyethylene or high-density polyethylene (HDPE) or polypropylene (PP). The closure element 51 is also produced from, for example hard polyethylene or high-density polyethylene (HDPE) or polypropylene (PP).

The flow cups 11 according to the invention are preferably extremely thin-walled products. The wall thickness of the material container 13 is in the range from 0.55 mm to 0.65 mm, specifically around 0.60 mm, and the wall thickness of the screw cover 15 is in the range from 0.50 mm to 0.85 mm, specifically 0.60 mm. The only exceptions are accumulations of material at local locations, e.g. for the formation of thread flanks, latching and gripping edges or on the outlet port, in particular for the formation of the clamping wedge element 18.

The screw cover 15 of the first exemplary embodiment and the material container 13 of the second exemplary embodiment are preferably produced in an injection-molding method in which the injection point of the components is located as centrally as possible on the concave end wall 71. In order to make this possible, the ventilation device 16 is disposed slightly off-center. It is disposed with an offset of more than 5% but less than 10% of the diameter of the end wall 71 towards the middle of the end wall 71.

In FIG. 3, the injection point 77, which is also the location 74 (FIGS. 1 and 9, maximum concavity), to the left of the ventilation opening 61 can be seen from a smaller accumulation of material. In the exemplary embodiment shown, the offset between the eccentric ventilation opening 61 and the central injection point 77 is 5.50 mm, with a diameter of the end wall 71 of 84.6 mm, this corresponds to 6.50%.

The flow cup 11 according to the invention and the spray gun 1 equipped therewith are suitable for atomizing and applying very different materials. A main region of application is automotive refinishing, in which top coat, filler and clear coat are used and which places very high demands on atomization and the properties of the spray jet. However, a large number of other materials can also be processed using the flow cup 11 and a possibly modified spray gun 1. The decisive factor is that the materials are free-flowing and can be sprayed, at least to a certain extent.

The invention claimed is:

1. A flow cup configured for use with a spray gun, the flow cup comprising:

a material outlet configured for at least one of direct and indirect connection to the spray gun;

a material container with a peripheral region;

a screw cover configured for closing the material container, the screw cover having a central region and a peripheral region with a receptacle groove formed by an outer leg, a connecting web, and an inner leg; and a closable ventilation device, wherein the material container is formed as a cup having a base and the closable ventilation device is disposed in the base of the material container, wherein the peripheral region of the material container is positionable in the receptacle groove of the screw cover and configured for forming a detachable and fluid-tight screw connection of the screw cover to the material container, wherein the central region of the screw cover adjoins the receptacle groove such that the central region of the screw cover adjoins a lower end of the inner leg of the receptacle groove, and wherein the central region of the screw cover extends radially outward toward the peripheral region and then has a substantially vertical annular portion that extends axially downward in a direction substantially parallel to the inner leg of the receptacle groove and toward the lower end of the inner leg of the receptacle groove and then has a substantially horizontal annular portion that extends substantially perpendicular to the inner leg of the receptacle groove and radially outward to connect a lowest end of the central region with a lowest end of the lower end of the inner leg of the receptacle groove.

2. The flow cup as claimed in claim 1, wherein a portion of the peripheral region of the material container is configured as an infolded eversion.

3. The flow cup as claimed in claim 2, wherein the infolded eversion is reinforced by radial transverse ribs.

4. The flow cup as claimed in claim 1, wherein the screw cover further comprises at least one threaded element configured for engaging with at least one corresponding threaded element on the material container to form the detachable and fluid-tight screw connection.

5. The flow cup as claimed in claim 1, further comprising at least one of at least one threaded element disposed on an inside of an outer leg of the receptacle groove and at least one threaded element disposed on an outside of an outer leg of an infolded eversion of the peripheral region of the material container.

6. The flow cup as claimed in claim 1, further comprising at least one threaded element disposed on the screw cover in an interior of the receptacle groove.

7. The flow cup as claimed in claim 6, wherein the at least one threaded element transitions into a central connecting web forming a base of the receptacle groove.

8. The flow cup as claimed in claim 1, wherein the detachable and fluid-tight screw connection is a multi-threaded screw connection.

9. The flow cup as claimed in claim 1, wherein, in a closed state of the flow cup, the screw cover encompasses the peripheral region of the material container.

10. The flow cup as claimed in claim 1, wherein the detachable and fluid-tight screw connection between the screw cover and the material container occurs via circumferential sealing in an interior of the receptacle groove.

11. The flow cup as claimed in claim 10, wherein the circumferential sealing includes radial sealing and axial sealing.

12. The flow cup as claimed in claim 1, wherein a thickness of a wall of the material container has a range from 0.55 mm to 0.65 mm.

13. The flow cup as claimed in claim 1, wherein the ventilation device is disposed off-center in the base of the material container.

14. The flow cup as claimed in claim 13, wherein the ventilation device is disposed with an offset of more than 5% but less than 10% of the diameter of the base towards the middle of the base.

15. The flow cup as claimed in claim 1, wherein, in a closed state of the flow cup, the screw cover encompasses an infolded eversion of the peripheral region of the material container.

16. The flow cup as claimed in claim 1, wherein a thickness of a wall of the screw cover has a range from 0.50 mm to 0.85 mm.

17. The flow cup as claimed in claim 1, wherein the material outlet is disposed on the screw cover.

18. The flow cup as claimed in claim 1, wherein the ventilation device comprises a snap-in valve with a closure element that is configured to close a ventilation opening of the ventilation device.

19. A screw cover or a material container of the flow cup as claimed in claim 1.

* * * * *